(12) United States Patent
Berfanger et al.

(10) Patent No.: US 11,416,184 B2
(45) Date of Patent: Aug. 16, 2022

(54) PRINTING TARGET OBJECTS BASED ON RENDERING DATA

(71) Applicant: Hewlett-Packard Development Company, L.P., Spring, TX (US)

(72) Inventors: David M. Berfanger, Vancouver, WA (US); Jesse Sutherland, Vancouver, WA (US); Wesley R. Schalk, Vancouver, WA (US); Benjamin Hoopes, Boise, ID (US); Morgan T. Schramm, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/296,043

(22) PCT Filed: Dec. 21, 2018

(86) PCT No.: PCT/US2018/067248
§ 371 (c)(1),
(2) Date: May 21, 2021

(87) PCT Pub. No.: WO2020/131117
PCT Pub. Date: Jun. 25, 2020

(65) Prior Publication Data
US 2022/0004346 A1 Jan. 6, 2022

(51) Int. Cl.
*G06F 3/12* (2006.01)
*H04N 1/64* (2006.01)

(52) U.S. Cl.
CPC .......... *G06F 3/1208* (2013.01); *G06F 3/1237* (2013.01); *H04N 1/64* (2013.01)

(58) Field of Classification Search
None
See application file for complete search history.

(56) References Cited

U.S. PATENT DOCUMENTS

| | | |
|---|---|---|
| 6,304,345 B1 | 10/2001 | Patton et al. |
| 6,748,106 B1 | 6/2004 | Bryant et al. |
| 6,894,794 B1 | 5/2005 | Patton et al. |
| 6,956,958 B2 | 10/2005 | Fan et al. |
| 7,428,076 B2 | 9/2008 | Bhattacharjya et al. |
| 7,961,905 B2 | 6/2011 | Harrington |
| 8,929,686 B2 | 1/2015 | Evevsky et al. |
| 9,307,114 B2 | 4/2016 | Hoarau et al. |
| 2002/0176599 A1 | 11/2002 | Levy et al. |
| 2006/0028689 A1 | 2/2006 | Perry et al. |
| 2006/0044342 A1 | 3/2006 | Tajika et al. |
| 2007/0127771 A1 | 6/2007 | Kaneda et al. |
| 2009/0161141 A1 | 6/2009 | Shobu |

*Primary Examiner* — Lennin R Rodriguezgonzalez
(74) *Attorney, Agent, or Firm* — Conley Rose PC

(57) ABSTRACT

Example printing devices and methods of the printing devices are disclosed. Target data is received responsive to imaging the source item. The source item includes a mark indicative of rendering information. The target data is used to detect the rendering information. The target object is output based on the target data and the rendering information.

15 Claims, 2 Drawing Sheets

PRINTING TARGET OBJECTS BASED ON RENDERING DATA

BACKGROUND

Printing devices can include printers, copiers, fax machines, multifunction devices including additional scanning, copying, and finishing functions, all-in-one devices, or other devices such as pad printers to print images on three dimensional objects and three-dimensional printers (additive manufacturing devices). In some examples, printing devices can receive scans of two-dimensional or three-dimensional items for printing. Printing devices apply a print substance often in a subtractive color space or black to a medium via a device component such as a printhead. The medium can include various types of print media, such as plain paper, photo paper, polymeric substrates and can include any suitable object or materials to which a print substance from a printing device are applied including materials, such as powdered build materials, for forming three-dimensional articles. Print substances, such as printing agents, marking agents, and colorants, can include toner, liquid inks, or other suitable marking material that in some examples may be mixed with other print substances such as fusing agents, detailing agents, or other materials and can be applied to the medium.

DETAILED DESCRIPTION

Figure 1:
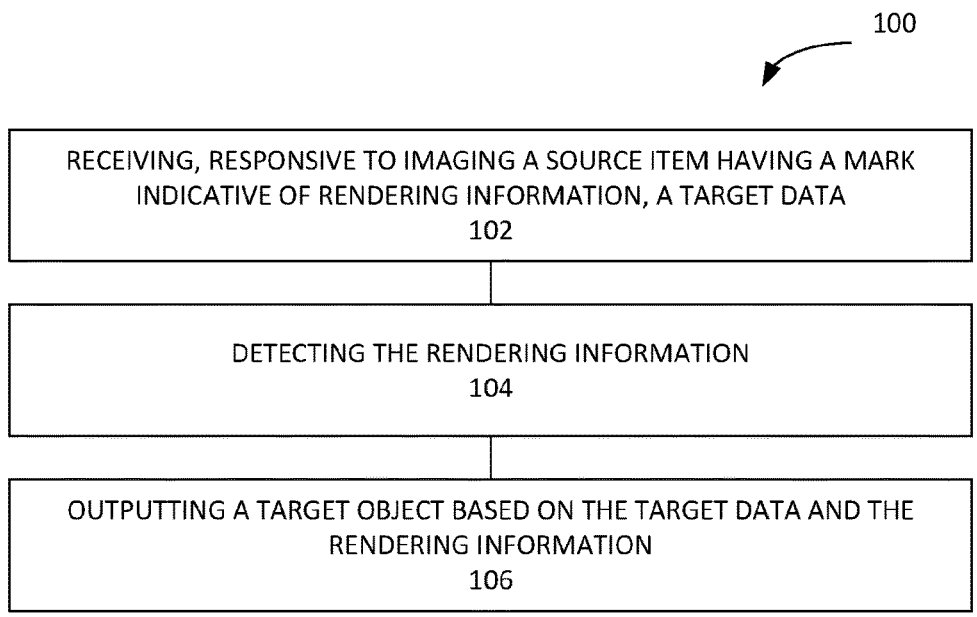
FIG. 1 is a block diagram illustrating an example method.

Printing devices can employ a small set of print substance colors to render the colors of the gamut in a subtractive color space. For example, a printing device can include device components to apply various combinations of amounts of a cyan print substance, a magenta print substance, a yellow print substance, and a black print substance to render the colors of the gamut in a type of cyan-magenta-yellow-key (black) (CMYK) color space. Print substance formulations for many colors in the gamut can be stored on multidimensional look up tables in the printing device, and other colors in the gamut can be determined via interpolation with a processing device. In general, the quality of an image produced with a printing device is generally based on a print substance amount for a given medium. For example, more print substance amount produces a more vibrant image on the given medium. Thus, print substance formulations for the colors in a "full color mode" or "best mode," which can include parameters of such modes, on a printing device may include amounts of print substances that approach the limits of an ability or capacity of the medium to receive or absorb the print substance.

Typically, the colored print substances, such as cyan, magenta, and yellow print substances, are significantly more expensive than similar amounts of black print substances. For certain applications or industries, the disparity in cost can lead to a substantially greater expense for full color printing, such as in a full color mode than for black-and-white or greyscale printing in a black-and-white mode. Often, black and white images of color files lack significant information or distinctions that users may find valuable or pleasing. Accordingly, the printing devices attempt to address the expense of full color mode by printing color documents in a low cost mode or a depletion color mode, which can include parameters of such modes, that may use a depletion color technique. As used in this disclosure, greyscale documents, such as black and white text, and multiple color images, such as full color images, can be subjected to low cost mode or depletion color mode printing.

Depletion color techniques typically provide cost savings over full color mode at the expense of print quality including desaturated content, lower dynamic range, and reduced contrast. Examples of depletion color techniques can include uniform color depletion that uniformly scales back the amounts of print substances of the print substance formulations used in full color mode. Other techniques may include grey component replacement, or GCR, which replaces a selected amount of CMY printing agents or colorants with black printing agents or colorants for many colors. GCR renders many colors with a combination of black and just two colors of three CMY print substances instead of using all three colors of CMY print substance. Still other depletion color technologies address luminous intensity across color ramps rather than moderation of print substance amounts.

Print substance levels in printing from source data, such as a primary digital file of a document or photograph, can be controlled to maintain visibility and information content or to selectively degrade quality to save cost. For example, the source data can be selectively printed in full color or high quality mode or selectively printed in depletion color mode to produce a source item. Copies of the source item, however, can produce target items having lower quality than the source item, particularly in cases where the copies are provided in depletion color mode. Subsequent or successive copies of the target item can further reduce quality of the target item.

This disclosure describes a printing device that can receive an image of a source item having a mark encoding rendering information and adjust an output to reproduce the image. The source item having the mark is imaged, such as copied or scanned to produce target data. The target data is received, and the rendering information is detected. Based on the rendering information and the target data, a target object is output. In one example, a source item includes printed content that comprises a generally obscured mark, such as data hidden in a halftone pattern of the printed content. The mark encodes rendering information such as the mode used to produce the printed content of the source item. For example, rendering information can signal that the source item was printed in a depletion mode or a low cost mode. The copy or scan of the source item produces target data. The rendering information can be recovered from the target data. An output target object, such as a target item printed to reproduce the source item from the target data, can be adjusted to preserve quality or prevent further degradation based on the rendering information.

FIG. 1 illustrates an example method 100 for generating a target object from an imaging of a source item, such as printing a target item from scanning or copying the source item, that may reduce further degradation of quality of the target object. Target data is received responsive to imaging the source item at 102. The source item includes a mark indicative of rendering information. For example, target data in the form of a digital file is produced from a scan or copy of a source item. The source item includes printed content that can include an image printed on a medium, such as an image on paper or an image printed on an article, or a three-dimensional article or device. In the example, the printed content is captured as the target data during imaging of the source item. The mark encodes the rendering information. The target data can be stored in a memory device. The target data is used to detect the rendering information at 104. In one example, the rendering information can be detected during imaging of the source item with the data reader. Detecting the rendering information at 104 can include identifying the mark and decoding the rendering information encoded with the mark. The rendering information can include such material as an identification of the mode in which the source item was printed or instructions for outputting a target object from the target data. The target object is output based on the target data and the rendering information at 106. In one example, the target object is a target item generally corresponding with the source item. The target object can be printed as a target item that is an enhanced version of the source item or a target item that is not printed in a low cost or depletion color mode.

The target data is received at 102. The target data, in one example, is the digital file of an imaged source item. The source item includes a mark indicative of rendering information. In one example, the source item having the mark is imaged in a copy process, in which target data generated from an imaged source item is used to print a target item. The printed target item may be a faithful copy of the source item, in which the target item is generated in a full color, or best mode. The printed target item may also be generated in a depletion mode or low cost mode. The target data, including the rendering information may be generated in a memory device after imaging, and the target data may be received at 102 at some time subsequent to imaging the source item having the mark.

The mark can be printed on the source item at the time the source item is created. For example, the mark can be included proximate the printed content of the source item or included in the printed content of the source item. In one example the mark can be positioned on a region of the source item that may be designated as including rendering information, such as in a selected corner of the source item. In another example, the mark can be hidden within the printed content of the source item. In one example, the mark can be positioned within the printed content of the source item to delineate a region of the printed content that may correspond with rendering information encoded in the mark. In some examples, the source item may include a plurality of marks indicative of plurality of rendering information.

The mark can be provided in a format such as data-bearing image that encodes the rendering information. Examples of data-bearing images can include linear barcodes, matrix barcodes, and data-bearing halftone images such as visually significant barcodes. Data-bearing halftone images can convey digital information through printing and imaging via selectively manipulating and then interpreting the halftone structure associated with a given carrier image to form the mark. In one example, the carrier image can be the printed content of the source item. In another example, the carrier image can be proximate the printed content of the source item. The rendering information can be encoded in the halftone of a carrier image by selectively shifting halftone clusters, or repositioning the cluster, to carry bits of a digital payload. While the mark may be difficult to discern with the eye, data readers applied during imaging of the source item or to the target data can interpret the shifts of the halftone clusters in the carrier image to decode the rendering information.

In another example, the mark on the source item can be provided in a format that includes a feature, such as a three-dimensional shape, appended to or included with the source item. The feature may include a predetermined size and contour that, once detected by a data reader, can interpret the feature to recover a payload to indicate rendering information. In one example, the feature included on the source item may be selected from a group of features that each corresponds with given rendering information.

The rendering information can include such information as an identification of the mode in which the source item was printed, or print mode, or instructions for outputting or rendering a target object from the target data. In one example, the rendering information encoded in the mark can include an identification of the particular mode used to print the source item. For instance, the rendering information can identify the source item as printed in a depletion mode or a low cost mode. In another example, the rendering information can identify a region of the source item that was printed in a depletion mode or a low cost mode or a region of the source item that may become illegible if copied in a depletion mode or a low cost mode.

The target data is used to detect the rendering information at 104. For example, the mark can be identified from the target data, and the rendering information is decoded from the mark using the target data. Data processing devices can execute recovery tools to decode the rendering information from the mark, interpret the rendering information, and adjust controls or perform other functions for outputting the target object in response to the rendering information. In one example, the data readers applied during imaging of the source item can identify the mark and decode the rendering information. In another example, imaging of the source item produces the target data, and data readers are applied to the target data stored in a memory device to decode the rendering information. The target data can be stored in a memory device with the rendering information. In one example, a controller in a copier can include data processing devices having data readers and recovery tools to identify the mark and detect the rendering information.

The target object is output based on the target data and the rendering information at 106. The target data can include the digital file produced from imaging the source item. The target object is generated from the digital file produced from imaging the source item and the rendering information. For example, a target item is printed based on the target data and the rendering information. The rendering information may cause a change in device setting or a selection of a particular mode to output the target object. For example, the presence of rendering information in target data indicating that the source item was printed in a depletion mode or low cost mode may cause device setting to print a target item in full color mode to prevent further degradation in quality that may result if the target item was printed in a depletion mode or low cost mode. In one example, the mark encoding the rendering information not included in the target object, and a target mark that includes rendering information of the target object is included instead, in the format of the mark on the source item.

Figure 2:
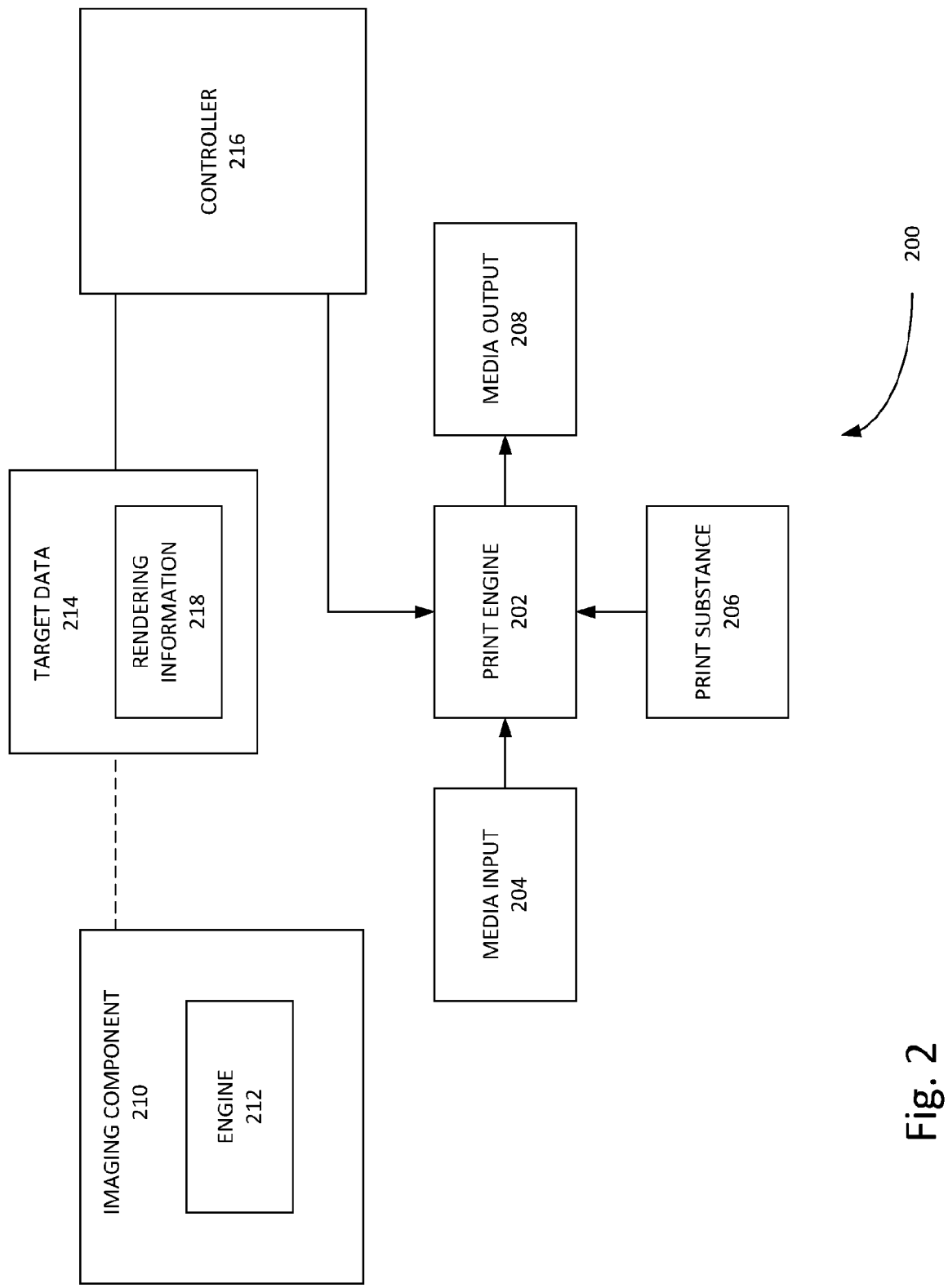
FIG. 2 is a block diagram illustrating an example printing device to implement the example method of FIG. 1.

FIG. 2 illustrates an example printing device 200 that can implement example method 100 and produce target items as objects or images on media. Printing device 200 includes a print engine 202 that includes mechanisms and logic to print content on media as target items. A media input 204 can provide a selected medium to the print engine 202 on which the content can be printed or marked. The print engine 202 is coupled to a consumable print substance 206, which can be used to print the medium based on a print substance formulation associated with a print mode of the printing device 200 such as a full color mode, or best mode, and a depletion color mode, or low cost mode. The printing device 200 in one example can selectively implement a print mode from a plurality of available print modes. In one example, the printing device 200 can implement a subtractive color space and the print substance 206 includes each of a cyan, magenta, yellow, and black print substance. In another example, the printing device 200 can implement a greyscale color space and the print substance includes a black print substance. Examples of print engines 202 can include ink jet print engines that apply a fluid, such as a liquid print substance 206, and laser print engines that apply particles of a toner as the print substance 206. In one example, the print engine 202 delivers the print substance 206 to the medium via a print head proximate the medium. Printed media from the print engine 202 can be provided to a media output 208 as the target item, target item having a target mark encoding target rendering information, or a source item having the rendering information. In one example, the media output 208 can include or be coupled to a finishing module that can cut, collate, stack, staple, or otherwise provide the printed media in a finished form.

In one example, the printing device 200 can be operably coupled to an imaging component 210. For instance, the imaging component 210 can be incorporated into the printing device 200 such as in a copier or multifunction device having printing, copying, and scanning functions. In another example, the imaging component 210 can be remote from the printing device such as a fax machine or network printing device operably coupled to a scanning device. The imaging component 210 is configured to receive a source item including the mark encoding the rendering information. Imaging component 210 includes a imaging engine 212 that, in one example, can receive light reflected from source item, convert the light to signals, and convert the signals to imaging data in the form of the target data 214. In one example, the imaging component 210 can include a data reader and recovery tools to identify the mark and decode the rendering information. The target data 214 can be stored on a memory device and provided to a controller 216.

The controller 216, which can include a combination of hardware and programming, such as firmware stored on a memory device, is operably coupled to the print engine 202 to perform methods that control the print process. In one example, the controller 216 can select a print mode from the plurality of available print modes and provide signals to the print engine 202 to execute the print mode. For example, the controller 216 can receive signals, such as electrical, optical, or mechanical signals, from a memory device storing the target data 214. The target data 214 includes rendering information 218. In one example, the controller 216 can detect the rendering information 218 from the target data 214. The controller 216 can execute recovery tools to recover and interpret the rendering information 218 from the mark and adjust controls of the print engine 202 or perform other functions for outputting a target object in response to the rendering information 218. The controller 216 can also implement or include tools to enhance a rendering of the target data including image sharpening tools, filters, or color enhancing tools. Also, the controller 216 can implement or include tools to generate a mark to encode rendering information and produce a source item, remove the mark from the target data, or generate a target mark in the target object that can encode target rendering information of a target item produced with the print engine 202. Based on the target data 214 and the rendering information 218, the controller 216 provides signals to the print engine 202 to output a target object such as a target item including the printed content of the source item.

In one example of method 100 executed with printing device 200, a source item having an example mark is to be copied in a depletion mode or low cost mode. A printing device 200 having a print engine 202 and an imaging component 210 to image the source item, create a digital file of target data, and then print the target data as a target object is provided to execute method 100. The printing device 200 can include controls to adjust an output such as to select a printing mode from a plurality of available modes. A depletion mode or low cost mode may be provided as a default setting of a copy process or may be a manually selected setting of the copy process of the printing device. The rendering information encoded in the example mark indicates the source item was printed with a depletion mode. Target data is received responsive to imaging the source item at 102. As part of the copy processes, the source item is imaged with the imaging component 210 of the printing device 200 to produce target data as a digital file. The rendering information is included in the target data. The target data is used to detect the rendering information at 104, and the target object is output based on the target data and the rendering information at 106. Upon detection of the rendering information with recovery tools that can be executed with the controller 216, a copy setting can be adjusted to output a target object based on the target data in a full color mode rather than the selected depletion mode or low cost mode in order to preserve quality of the print content of the source item. The target object can include a target item that corresponds with the source item. Additionally, the controller 216 can generate a target mark in the target item, such as a halftone pattern printed in the target item, that can encode target rendering information of a target item. In the example, the target mark can encode target rendering information that identifies the target item as being a copy of an original printed in a depletion mode. (Upon detection of the target rendering information with recovery tools that can be executed with the controller 216, a copy setting can be adjusted to output a subsequent target object based on the subsequent target data in a full color mode rather than the selected depletion mode or low cost mode in order to preserve quality of the print content.)

In another example of method 100 executed with a printing device 200, a source item having an example mark is to be copied in a depletion mode or low cost mode, but the rendering information in the example mark indicates a region of the source item includes printed content that may become illegible if copied or reproduced in a depletion mode or low cost mode. Target data is received responsive to imaging the source item at 102. The source item with the mark is imaged to produce target data with an imaging component 210 of a printing device such as a copier. The target data is used to detect the rendering information at 104. The rendering information in the target data is detected as part of the copy process such as with the controller 216. The target object is output based on the target data and the rendering information at 106. The target data corresponding with the region of the source item indicated in the rendering information can be enhanced with a controller 216 to provide for legibility of the region when printed in the depletion or low cost mode. The controller 216 can generate a target mark in the target item that can encode target rendering information of a target item. In the example, the target mark can encode target rendering information that identifies the target item as being a copy of an original printed in a depletion mode with an enhanced region.

Figure 3:
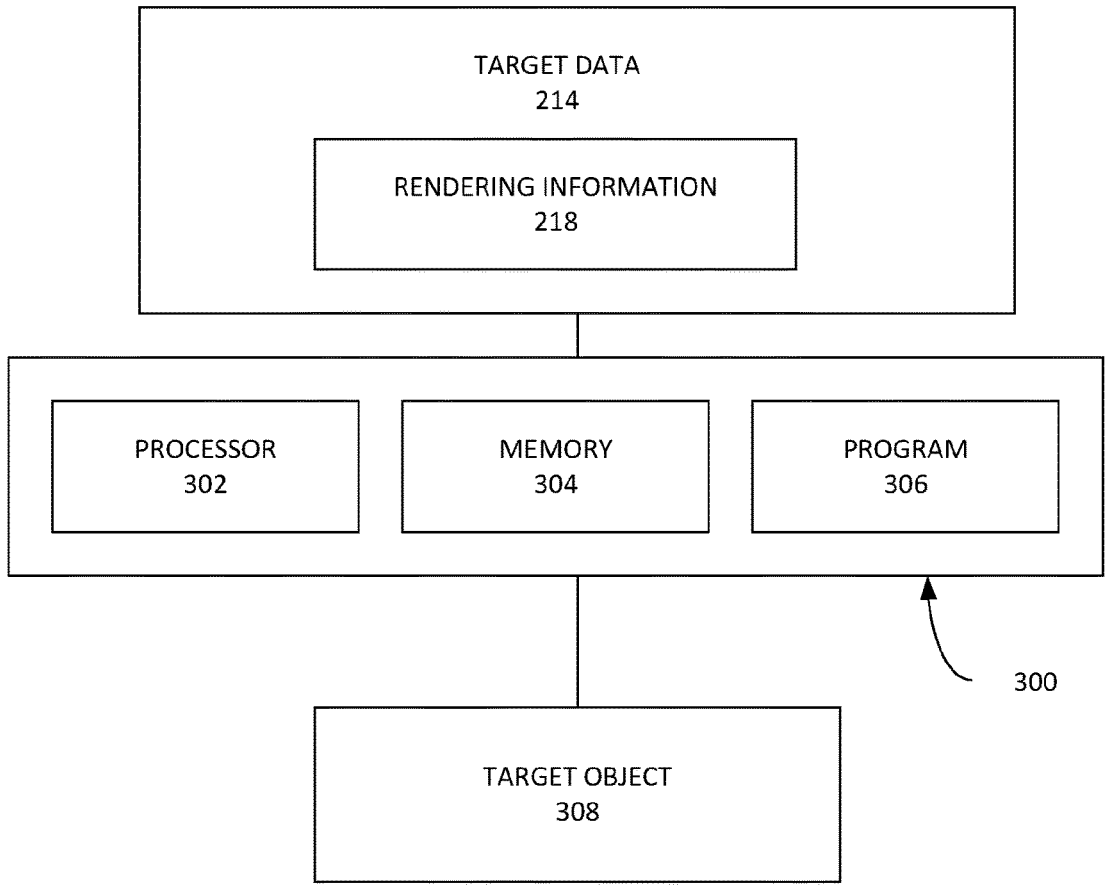
FIG. 3 is a block diagram illustrating an example system to implement the example method of FIG. 1, which can be included in the example printing device of FIG. 2.

FIG. 3 illustrates an example system 300 including a processor 302 and memory 304 and program 306 to implement example method 100. In one example, system 300 can be implemented with the controller 216 of the printing device 200. Program 306 can be implemented as a set of processor-executable instructions stored on a non-transitory computer readable medium such as memory 304. Computer readable media, computer storage media, or memory may be implemented to include a volatile computer storage media, nonvolatile computer storage media, or as any suitable method or technology for storage of information such as computer readable instructions, data structures, program modules or other data. A propagating signal by itself does not qualify as storage media or a memory device.

System 300 is configured to receive a target data 214. The target data 214 can be produced from imaging a source item having a mark indicative of rendering information 218. The program 306 can include a data reader to recover the rendering information or recovery tools to detect the rendering information. The program 306 can include processes to adjust a print process based on the target data 214 and the rendering information 218. The system outputs a target object 308 based on the target data 214 and the rendering information 218. In one example, the target object is a target item having printed content corresponding with the source item.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method, comprising:
   receiving, responsive to imaging a source item having a mark indicative of rendering information, a target data;
   detecting, using the target data, the rendering information; and
   outputting a target object based on the target data and the rendering information,
      wherein the rendering information identifies a region of the source item that is illegible if printed in a depletion mode.

2. The method of claim 1 wherein the outputting the target object includes adjusting an output for printing a target item with the target data.

3. The method of claim 2 wherein the target item is a printed target image.

4. The method of claim 1 wherein the target data is received while copying the source item.

5. The method of claim 1 wherein the outputting the target object includes adjusting a print setting from printing in the depletion mode to printing in a full color mode.

6. The method of claim 1 wherein adjusting the output includes enhancing image quality of a target object in response to the rendering information.

7. The method of claim 1 wherein the mark includes a data-bearing image on the source item.

8. The method of claim 1 wherein the rendering information includes an identification of printing mode of the source item.

9. The method of claim 1 comprising replacing the mark with a target mark in the target data, the target mark identifying rendering information of the target object, and printing the target object including the target mark.

10. The method of claim 1 wherein the mark identifies rendering information for a region of the source item, and the outputting includes adjusting an output of area section of the target data corresponding with the region in response to the rendering information.

11. A system, comprising:
   a memory to store a set of instructions; and
   a processor to execute the set of instructions to:
   receive, responsive to imaging a source item having a mark indicative of rendering information, a target data;
   detect, using the target data, the rendering information; and
   output a target object based on the target data and the rendering information, wherein the rendering information identifies a region of the source item that is illegible if printed in a depletion mode.

12. The system of claim 11 comprising instructions to generate the target data in response to imaging the source item.

13. The system of claim 11 wherein the target object is a printed target item based on the target data and the rendering information.

14. A non-transitory computer readable medium to store computer executable instructions to control a processor to:
   receive, responsive to imaging a source item having a mark indicative of rendering information, a target data;
   detect, using the target data, the rendering information; and
   output a target object based on the target data and the rendering information, wherein the rendering information identifies a region of the source item that is illegible if printed in a depletion mode.

15. The non-transitory computer readable medium of claim 14 further comprising instructions to generate a target mark encoding target rendering information on the target object.

* * * * *